A. DAVIS.
EXTENSIBLE WAGON REACH.
APPLICATION FILED MAR. 14, 1908.
926,855.
Patented July 6, 1909.
2 SHEETS—SHEET 2.
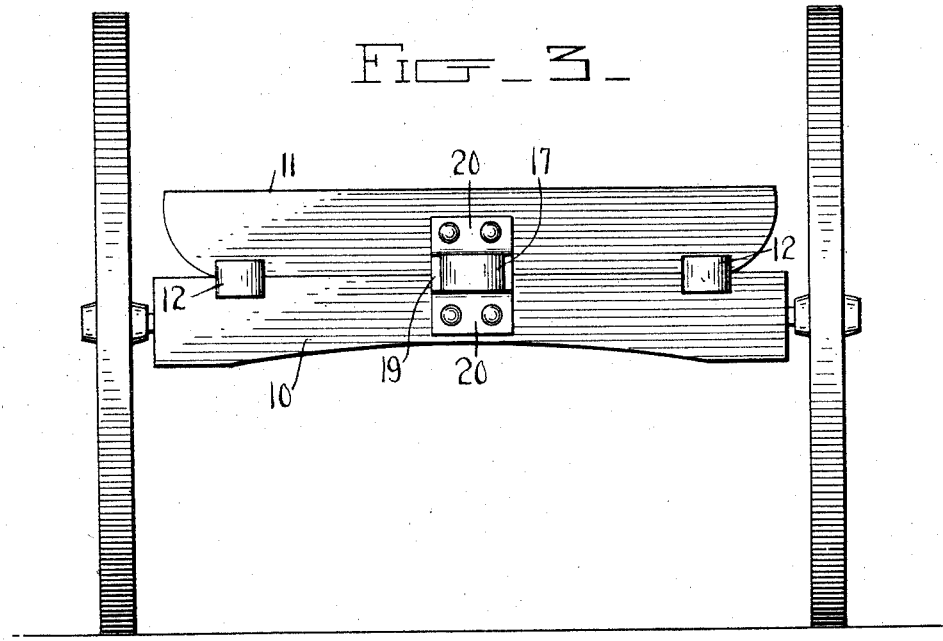
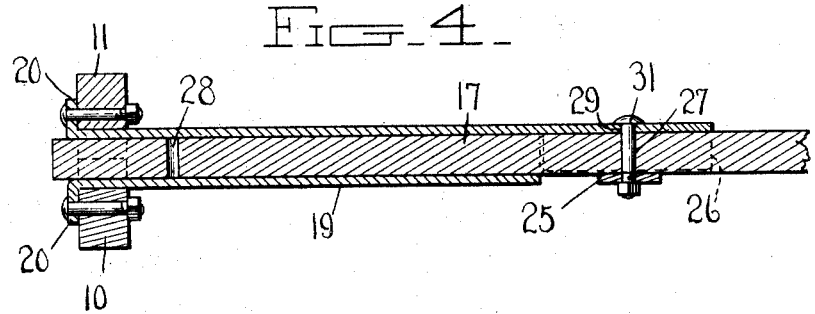
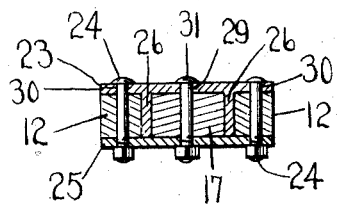
Witnesses
L. B. James
H. L. Smith
Inventor
Ark Davis
By Chandler & Chandler
Attorneys

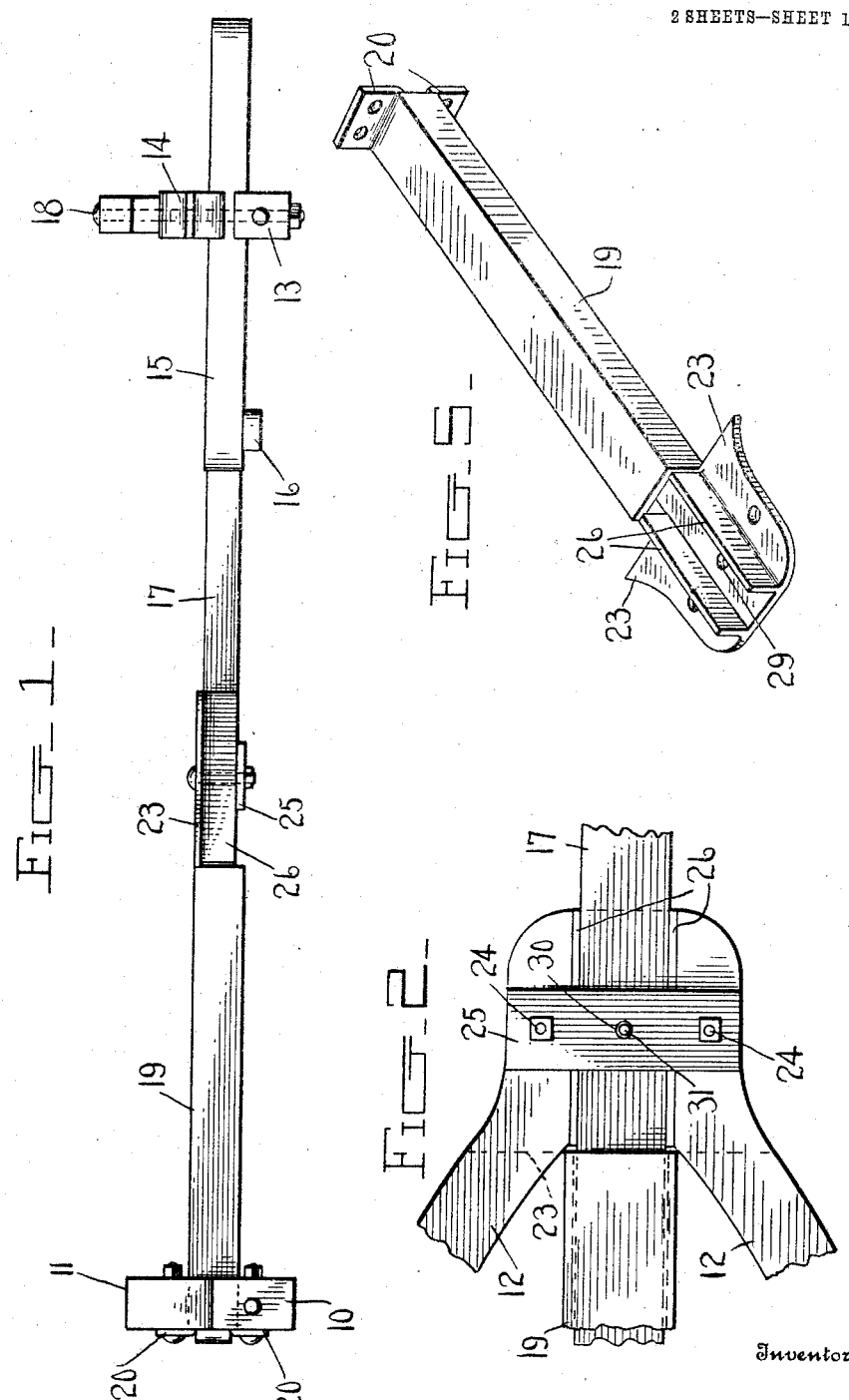

UNITED STATES PATENT OFFICE.

ARK DAVIS, OF WASHINGTON, INDIANA.

EXTENSIBLE WAGON-REACH.

No. 926,855.  Specification of Letters Patent.  Patented July 6, 1909.

Application filed March 14, 1908. Serial No. 421,258.

*To all whom it may concern:*

Be it known that I, ARK DAVIS, a citizen of the United States, residing at Washington, in the county of Daviess, State of Indiana, have invented certain new and useful Improvements in Extensible Wagon-Reaches; and I do hereby declare the following to be a full, clear, and exact description of the invention, such as will enable others skilled in the art to which it appertains to make and use the same.

This invention relates to wagon reaches and more particularly to that class which are extensible so as to adapt the wagon running gear for the support of a wagon box or for transporting logs, lumber, hay, etc.

In carrying out my invention I have aimed not only to produce a wagon running gear adjustable as regards length but also to produce a construction which will be strong, durable, and cheap to manufacture, the parts of the device which render the truck extensible being so constructed and connected as to strengthen rather than weaken the running gear.

In the accompanying drawings, Figure 1 is a side elevation thereof, the near one of the rear hounds being broken away, Fig. 2 is a bottom plan view of the middle portion of the running gear, Fig. 3 is a rear end view thereof, Fig. 4 is a vertical longitudinal sectional view, Fig. 5 is an inverted perspective view in detail of the sleeve in which the reach is telescopically received, and, Fig. 6 is a vertical transverse sectional view taken through the running gear at the forward end of the reach receiving sleeve.

In the drawings, the numeral 10 designates the rear axle provided with the usual superposed bolster 11, and the numeral 12 indicates the rear hounds of the running gear of the wagon which extend forwardly from between the axle and the bolster with their forward ends spaced apart to receive between them the reach of the running gear. The front axle of the running gear is indicated by the numeral 13 and the front bolster by the numeral 14, the front hounds being indicated by the numeral 15 and being secured between the front axle and the front bolster as is usually the case, they being connected at their rear ends by means of the usual cross bar 16. The reach of the running gear is indicated by the numeral 17 and is received at its forward end between the front axle 13 and the front bolster 14, it being held in this position by means of the usual king bolt 18.

The numeral 19 indicates a box sleeve which is received at its rear end between the rear axle 10 and rear bolster 11 at a point mid-way of the ends thereof and is formed at its rear end edges with flanges 20 through which bolts are passed to secure the sleeve in place, it being understood that the flanges rest against the rear faces or sides of the axle and its bolster. From the rear bolster and axle, the sleeve 19 is extended forwardly in a horizontal plane with the hounds 12. At its upper inner end, the box-sleeve is provided with a horizontally disposed securing plate 23 to which are secured the two pendent flanges 26 as shown in Figs. 1 and 2 which plate and flanges form an integral part of the box-sleeve. These flanges 26 are so positioned that the distance between the inner faces thereof is slightly less than the width of the box-sleeve. This plate 23 is provided with three openings, the edge openings receiving the bolts 24 and the central opening 29 containing the pin 31. The inner ends of the hounds 12 are secured against the flanges 26 and the under surface of the plate, where they are retained by means of the bolts 23, as shown. The pin 21 carries a perforated cross plate 25, the perforations of which register with the openings within the plate 23. This cross plate 25 is arranged to bear against the edges of the pendent flanges 26 so as to form substantially a continuation of the box-sleeve when the plate is in position.

The reach 17 is formed at a point substantially mid-way of its ends with an opening 27 and at a point adjacent its rear end with an opening 28 and by sliding the reach in the sleeve 19, one or the other of these openings may be brought to register with openings 29 and 30 formed respectively in the attaching plate portion 23 of the sleeve and the plate 25, there being a pin 31 then passed through the openings 29 and 30 and one or the other of the openings in the reach, it being understood that when the pin is engaged through the opening 27 in the reach, the running gear is of such length as to accommodate the ordinary wagon box and that on the other hand when the pin is engaged through the other opening 28 in the reach, the running gear is so lengthened that it may be used as a lumber wagon, a log wagon, or a hay rack.

From the foregoing description of my invention it will be observed that I have provided a construction of running gear which is extensible and in which all of the parts are so connected that the running gear is strengthened rather than weakened by the provision of means whereby it may be extended.

What is claimed, is:—

The combination, in a running gear, of a box-sleeve having at one end two flanges secured to the rear axle and bolster and at the other end a horizontally disposed perforated top plate of a width greater than said box-sleeve, a pair of pendent flanges formed integrally with said top plate and arranged at less distance apart than the width of said sleeve, a running gear reach held between said flanges to project within said box-sleeve, a pin connecting said reach to said plate, a cross plate carried by said pin to form a continuation of the box-sleeve in connection with the top plate and flanges, and bolts adapted to secure the rear hounds of the running gear to said plate and flanges.

In testimony whereof, I affix my signature, in presence of two witnesses.

ARK DAVIS.

Witnesses:
 GEO. S. PARKS,
 LEW HARRIS.